March 9, 1965 R. W. LEWIS 3,172,419
CANOPY LOCK FOR BOATS
Filed Jan. 31, 1963
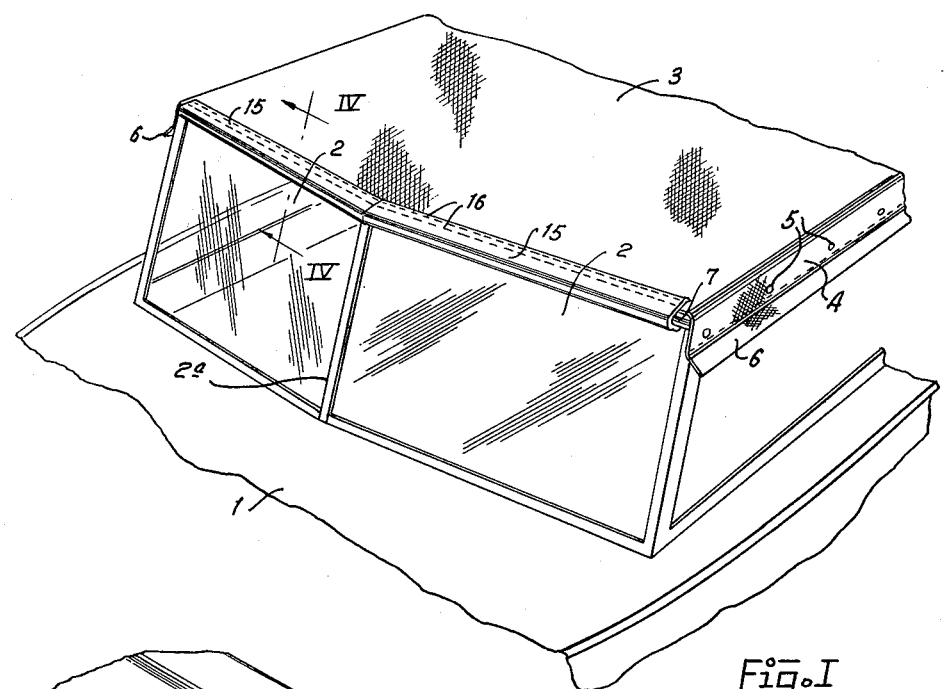
Fig. I
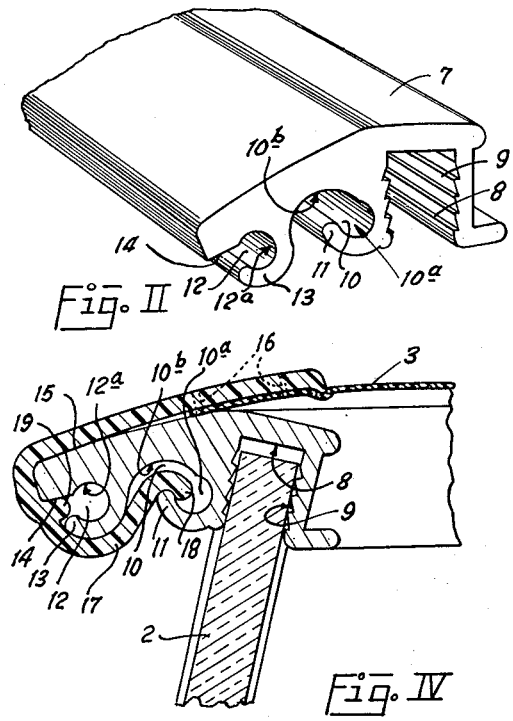
Fig. II
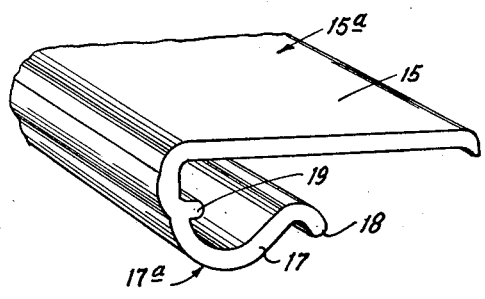
Fig. III
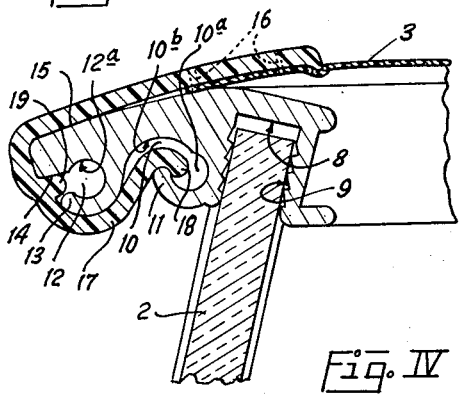
Fig. IV
INVENTOR
Roy W. Lewis
BY Howard E. Moore
ATTORNEY United States Patent Office 3,172,419
Patented Mar. 9, 1965

3,172,419
CANOPY LOCK FOR BOATS
Roy W. Lewis, Plano, Tex., assignor to Lone Star Boat Company, Plano, Tex., a corporation of Texas
Filed Jan. 31, 1963, Ser. No. 255,250
2 Claims. (Cl. 135—6)

This invention is concerned with means for attaching the edge of a boat canopy to the upper edge of the windshield on the boat in such manner as to provide quick, easy and secure attachment and quick and easy detachment of the canopy from the windshield when the canopy is raised or lowered.

On pleasure and similar type boats, it is desirable to have a retractable canopy thereon, which may be stretched over the cabin and secured to the front windshield for protection in inclement weather.

Various means of attachment of the canopy to the front windshield have been proposed, none of which have been entirely satisfactory.

It is, therefore, a primary object of this invention to provide means for detachably securing the front edge of a canopy on a boat or other vehicle to the upper edge of the windshield thereof in such a manner as to stretch the canopy, provide a secure and sealed connection therebetween, and which may be quickly and easily attached and detached.

Another object of the invention is to provide means for detachably securing the front edge of a canopy to the upper edge of the windshield on a boat or other vehicle, which includes interengaging parts comprising a rigid attachment member secured to the upper edge of the windshield, and a flexible attachment member secured to the front edge of the canopy having a flexible lip thereon which may be flexed and sprung to engage with complementary channels in the rigid attachment member in such a manner that the parts cannot be disengaged without manually flexing the engaged lip of the flexible member out of engagement with the complementary lip on the rigid member.

Other and further objects of the invention will become apparent upon reading the detailed specification hereinafter following, and by referring to the drawings annexed hereto.

A suitable embodiment of the invention is shown in the attached drawings wherein:

FIGURE I is a fragmentary, perspective view of a boat showing the front edge of a canopy attached to the upper edge of the windshield employing the novel attachment means herein described and claimed;

FIGURE II is a perspective end view of the rigid attachment strip which is secured to the upper edge of the windshield;

FIGURE III is a perspective end view of the flexible attachment strip which is secured to the front edge of the canopy; and FIGURE IV is a cross-sectional, elevational view taken on the line IV—IV of FIGURE I.

Numeral references are employed to designate the various parts shown in the drawings, and like numerals indicate like parts throughout the various figures of the drawings.

The numeral 1 generally indicates a boat which has upwardly extending windshield sections 2, which, as shown, are flat and angularly disposed and separated by a center mullion 2a. However, it will be understood that this improvement could be used with a windshield which is one piece and straight or curved.

The canopy 3, which is customarily made of waterproof fabric, may have an overhanging flap 4 along each edge thereof which may be detachably secured to the windshield frame by means of snaps 5.

An angularly disposed reinforced strip 6 may be provided along each lower side edge of the canopy for the purpose of providing an eave for directing rain water or spray outwardly.

A rigid strip or extrusion, generally indicated at 7, which is preferably made of lightweight metal such as aluminum, is secured to the upper edge of the windshield sections 2. As shown, the border 7 would be in two pieces, one of each section being secured to the upper edge of a windshield section 2. However, if the windshield were in one piece and straight, the border 7 would also be in one piece, to fit thereon; or if the windshield were in one piece and curved, the border 7 would be in one piece and shaped to the curvature of the upper edge of the windshield.

A generally rectangular shaped channel 8 is formed on the lower rear side of the extrusion 7, said channel being arranged to fit over the upper edge of the windshield section 2, as shown in FIGURE IV. The channel 8 has serrations 9 on the inner sides thereof to grip the edge of the glass.

A locking channel 10 is formed along the lower side of the border member 7, said locking channel including a rounded portion 10a, and an arcuate portion 10b, and including an upwardly projecting, inwardly turned generally arcuately shaped lip 11 having an edge extending into the channel 10.

A channel 12 is formed along the outer edge of the extrusion 7, said channel including a rounded portion 12a, providing an upwardly projecting, generally arcuately shaped lip 13. The opening to the channel 12 provides a downwardly facing shoulder 14.

The locking strip 15 is made of flexible material, such as vinyl plastic, and has an extension 15a thereon which may be attached to the upper outer edge of the canopy 3 by means of stitching 16. As shown, the strip 15 is in two pieces to conform to the angular disposition of the windshield sections 2. However, it will be understood that same could be made in one piece in the event that the windshield section is straight and in one piece, or in one piece and curved. The flexible material of the strip 15 would conform to the curvature of the upper edge of the windshield.

The flexible locking strip 15 is formed to provide a reversely turned lip section 17 which has a generally arcuate portion 17a to conform to the arcuate outer edge of the lip 13. The lip portion 17 is terminated by a downwardly turned lip section 18, which is generally arcuately shaped and is arranged to overlap, and extend beyond, the upwardly projected lip 11 on the rigid border member 7.

An inwardly projecting rib 19 is provided on the inner side of the lip portion 17, said rib being arranged to engage with the shoulder 14 on the rigid border member 7 when the attachment members are interengaged.

To attach the flexible strip 15 to the rigid border member 7, the front edge of the canopy 3 is pulled forwardly and stretched over the upper edge of the windshield glasses 2. The flexible lip portion 17 is flexed downwardly and outwardly to allow same to pass over the outer edge of the rigid member 7, and the lip portion 18 is pushed into the channel 10 far enough to cause the lip portion 18 to engage into channel 10 and overlap the upper edge of the rigid lip 11. Upward pressure and then backward pressure is applied to the lip 15a and canopy 3 to allow the rib 19 to enter the outer edge of the rigid channel 12 and engage the shoulder 14.

Thus the flexible strip 15 is interlocked with the rigid member 7 and cannot be disengaged therefrom until the extension 15a and the canopy 3 is pushed upwardly, outwardly and then downwardly to release the rib 19 from the shoulder 14 and channel 12, and disengage the lip portion 18 from the rigid lip 11.

Force exerted rearwardly on the canopy 3 while the members 15 and 7 are engaged, actually tightens the engagement therebetween by reason of the leverage exerted between the lips 18 and 11, and the rib 19 and shoulder 14.

The rounded sections 10a and 12a of the channels 10 and 12 provide convenient screw attachment channels for attaching the rigid member 7 to the vertical mounting members at each edge of the windshield.

The member 15 is preferably made of flexible type material, as indicated, and would provide a seal between the members 15 and 7 by reason of the pressure attachment therebetween.

The flexible border member 15 may be quickly detached from the rigid member 7 by simply pushing the extension 15a and canopy 3 upwardly, outwardly, and then downwardly, thus releasing the canopy from the front edge of the windshield.

It will thus be seen that I have provided a detachable canopy attachment between the front edge of a canopy on a boat or other vehicle, and the upper edge of a windshield, which is quick and easy to attach and detach, provides a sealed connection therebetween, and at the same time provides a secure attachment which cannot become detached even though great force is exerted thereagainst.

It will be understood that other and further embodiments of the invention may be devised without departing from the spirit and scope of the appended claims.

Having described my invention, I claim:

1. Means for detachably attaching a canopy to the edge of a windshield comprising, a rigid border member attached to the edge of the windshield and having a portion extending outwardly therefrom; a first channel along the lower edge of the outwardly extending portion of the rigid border member; an upwardly projecting lip in the channel; a second channel formed along the outer edge of the rigid border member, having an arcuately shaped, upwardly projecting lip along the lower edge thereof, and providing a downwardly facing shoulder along the upper edge thereof; a flexible border member secured to the edge of the canopy having a portion projecting outwardly therefrom; a reversely turned lip portion on the outwardly projecting portion of the flexible border member said lip including a generally arcuately shaped downwardly projecting outer edge arranged to engage and overlap the edge of the upwardly projecting lip in the first channel of the rigid border member; and a rib extending along the inner side of the reversely turned lip portion of the flexible member arranged to engage the downwardly facing shoulder when the border members are interengaged.

2. Means for detachably attaching the edge of a canopy to the edge of a windshield comprising, a rigid border member secured to the edge of the windshield; a flexible member attached to the edge of the canopy; an outwardly extending portion on the rigid member; an outwardly extending portion on the flexible member; a reversely turned lip on the outwardly extending portion of the flexible member; said lip being arranged to be flexed over and embrace the outwardly extending portion of the rigid member; an upwardly projecting portion on the lower side of the outwardly extending portion of the rigid border member; a downwardly extending portion on the reversely turned lip engageable with the upwardly projecting portion; a downwardly facing shoulder on the outwardly extending portion of the rigid member; and a rib on the inner side of the lip engageable with the shoulder.

References Cited by the Examiner

UNITED STATES PATENTS 3,093,845   6/63   Brock et al. _____ 135—6 X

FOREIGN PATENTS 853,280   11/60   Great Britain.

HARRISON R. MOSELEY, *Primary Examiner.*